Inventor
Pierre Etienne Bessiere
by Lucke & Lucke
Attorney

Patented Sept. 4, 1951

2,566,715

UNITED STATES PATENT OFFICE 2,566,715

DEVICE TO PREVENT OVERHEATING OF SHAFT BEARINGS

Pierre Etienne Bessiere, Paris, France, assignor to Societe Electro-Mecanique de l'Aveyron S. A., Rodez, France, a society of France Application May 29, 1948, Serial No. 30,028
In France July 22, 1947

5 Claims. (Cl. 308—77)

The present invention relates to the protection against overheating of the bearings of rotary shafts and more particularly but not exclusively of the bearings of electrical apparatus such as electric brakes in which a rotor, preferably made of a magnetic metal, rigid with the shaft to be braked revolves in the magnetic field produced by electro-magnets, the braking effect being due to the parasitic currents thus generated in the rotor.

The chief object of my invention is to provide a device for ensuring this protection which is better adapted to meet the requirements of practice than those used up to this time.

According to a feature of my invention, the shaft is provided with means, made of a material which is a good conductor of heat, for by-passing the bearing to be protected in the flow of heat from the shaft to the outside, where it is dissipated into the atmosphere.

Another feature of my invention consists in thermally insulating from the shaft the portion of the bearing that turns together therewith.

Preferred embodiments of the present invention will be hereinafter described, with reference to the accompanying drawings, given merely by way of example, and in which.

Furthermore, preferably, these means have their outer ends constituted by flaring portions of large area which facilitate thermal interchanges with the surrounding atmosphere.

Figure 1:
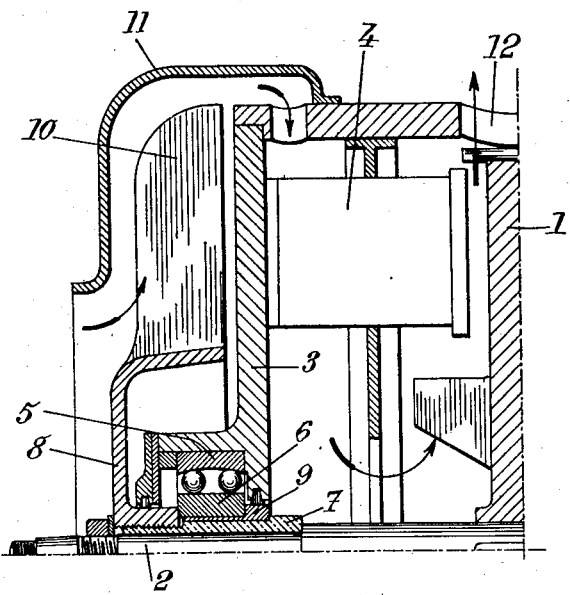
Fig. 1 is an axial section of a portion of an electric brake fitted with means for preventing exaggerate heating of these bearings, according to the invention.

In the embodiment of Fig. 1, the means in question consist of a lining 7 provided between shaft 2 and the portion 6 of bearing 5 which revolves together with this shaft, this lining being made of a material which is a good conductor of heat, such as aluminium, copper, etc. Lining 7 is provided at its outer end with a disc 8 located in the surrounding atmosphere, this disc being either rigid with lining 7 or fixed thereto, for instance by screwing. It is clear than an important portion of the heat flux coming from rotor 1 and which passes through shaft 2 to flow to the outside is conveyed through lining 7 to disc 8, without passing through bearing 5, 6, disc 8 ensuring dissipation of this heat into this atmosphere.

If the metal of lining 7 is not strong enough to support the pressure of the bearings, I may interpose, between lining 7 and the portion 6 of the bearing, a sleeve 9 of steel, preferably tempered steel, rigid with the lining and acting as a support for the bearing. In order to ensure fixation of sleeve 9 on lining 7, I may for instance mold it in the mass of the lining or may fix it on the lining with a force fit.

According to a particularly advantageous embodiment, disc 8 is fitted with fins or blades 10, whereby the disc and its blades constitute the rotor of a fan which blows cooling air, for instance guided by a casing 11, into frame 3 along the path indicated by the arrows, to flow out through apertures 12.

Concerning first the electric brake proper, with the exception of the means intended to prevent exaggerate heating of the bearings of its shaft, it may be arranged in any suitable manner, for instance as indicated by Fig. 1, where this brake includes a rotor 1, preferably of a magnetic metal, for instance soft steel, fixed to brake shaft 2. This shaft is housed in bearings provided in the side walls of a frame 3 inside which, on either side of rotor 1, are mounted pole pieces 4 which generate inside rotor 1, when excited by an electric current, Foucault currents the effect of which is to exert a strong braking action upon rotor 1.

It is clear that these Foucault currents cause rotor 1 to be heated. However, the means used for cooling down the rotor, for instance cooling air streams, often do not prevent transfer of a portion of the heat produced in rotor 1, to shaft 2 whence this heat, in the known devices travels toward the bearings 5 of this shaft, so that the temperature of these bearings rises higher and higher.

In order to reduce heating of bearings 5 or to keep this heating within admissible limits, while permitting a rise of the temperature of rotor 1, and, consequently, an increase of the power of the brake, I provide, according to the main feature of my invention, means, made of a material which is a good conductor of heat, for conveying heat from the shaft to the outside, without allowing this heat to flow through the bearing to be protected against heating.

Preferably, I dispose these means, with respect to the direction of flow of the calories through the shaft toward the outside, on the upstream side of the bearing to be protected and these means are so shaped as to convey heat to the outside along a path which avoids the bearing to be protected.

According to another feature of my invention, I thermally insulate from shafts 2 the portion 6 of the bearing which revolves together therewith. If the above first feature of the invention is used simultaneously, this insulation is, of course, between lining 7 or any other equivalent element which is a good conductor of heat and the fixed portion 6 of the bearing.

Figure 2:
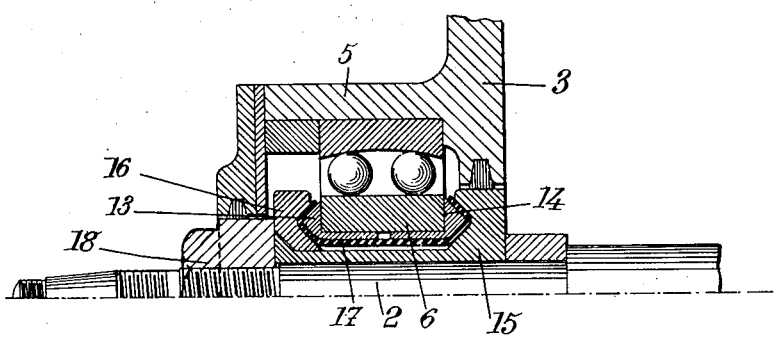
Fig. 2 is a section of the bearing of an electric brake provided with means capable of preventing exaggerate heating of this bearing according to a second embodiment of my invention.

For instance, as shown by Fig. 2, I place the portion 6 of the bearing between two annular pieces 13, 14 each of angular section and the part of which that extends at right angles to the axis of revolution of shaft 2 has a section the outer portion of which is of angular shape. Bearing element 6 and annular pieces 13, 14 are enclosed in a cage constituted for instance by two elements 15, 16, a layer 17 of a matter which is a bad conductor of heat, such as mica, asbestos or the like, being interposed between this cage and pieces 6, 13, 14. Cage 15, 16, the two elements of which may be connected together through any suitable means, is fixed to shaft 2 for instance through a nut 18.

It is clear that, in the construction shown by Fig. 2, layer 17 thermally insulates the bearing with respect to shaft 2. If cage 15, 16, or at least the element 15 of this cage is made of a metal which is a good conductor of heat and if this element 15 is connected with an external part capable of dissipating heat into the surrounding atmosphere, the construction carries out both the first and second features of my invention. However these two features may be used separately.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An an apparatus, in combination, a bearing, a shaft supported in this bearing and subjected in operation to a heating action on one side of said bearing, a lining of a metal which is a better conductor of heat than that of said shaft interposed between said shaft and the portion of said bearing that revolves therewith, and a disc in contact with said lining on the other side of said bearing for dissipating heat into the atmosphere.

2. A combination according to claim 1 further including blades carried by said disc.

3. In an apparatus, in combination, a bearing, a shaft supported in this bearing and subjected in operation to a heating action on one side of said bearing, a lining of a metal which is a better conductor of heat than that of said shaft interposed between said shaft and the portion of said bearing that revolves therewith, and heat radiating means in contact with said lining on the other side of said bearing for dissipation of heat into the atmosphere.

4. In an apparatus, in combination, a bearing, a shaft supported in this bearing and subjected in operation to a heating action on one side of said bearing, a lining of a metal which is a better conductor of heat than that of said shaft interposed between said shaft and the portion of said bearing that revolves therewith, heat radiating means in contact with said lining on the other side of said bearing for dissipation of heat into the atmosphere, and means for thermally insulating from said shaft the portion of said bearing that revolves together with said shaft.

5. In an apparatus, in combination, a bearing, a shaft supported in this bearing and subjected in operation to a heating action on one side of said bearing, said bearing including an inner raceway element revolving together with said shaft, two annular pieces fitting each on one side face of said bearing element and on a portion of the inner face thereof, said pieces having bevel-shaped outer side faces, a layer of an insulating material surrounding both of said annular pieces on the inner and side faces thereof, a metal cage interposed between said layer and said shaft, and made of two elements having grooved inner faces to fit on the bevel-shaped sides of said layer, said cage being made of a metal which is a better conductor of heat than that of said shaft, and heat radiating means in contact with said cage on the other side of said bearing for dissipation of heat into the atmosphere.

PIERRE ETIENNE BESSIERÈ.

REFERENCES CITED

The following references are of record in the file of this patent:

UNITED STATES PATENTS

| Number | Name | Date |
|---|---|---|
| 1,152,681 | Wieselgreen | Sept. 7, 1915 |
| 1,579,798 | Vail | April 6, 1926 |
| 2,202,424 | Hough | May 28, 1940 |
| 2,223,847 | Engdahl | Dec. 3, 1940 |